US010835445B2

(12) United States Patent
Uchida et al.

(10) Patent No.: US 10,835,445 B2
(45) Date of Patent: Nov. 17, 2020

(54) MOTION ASSIST DEVICE

(71) Applicant: HONDA MOTOR CO., LTD., Tokyo (JP)

(72) Inventors: Minoru Uchida, Saitama (JP); Nobuyuki Ohashi, Saitama (JP)

(73) Assignee: Honda Motor Co., Ltd., Tokyo (JP)

(*) Notice: Subject to any disclaimer, the term of this patent is extended or adjusted under 35 U.S.C. 154(b) by 411 days.

(21) Appl. No.: 15/827,702

(22) Filed: Nov. 30, 2017

(65) Prior Publication Data
US 2018/0177672 A1 Jun. 28, 2018

(30) Foreign Application Priority Data
Dec. 27, 2016 (JP) .................. 2016-254455

(51) Int. Cl.
*A61H 3/00* (2006.01)
*A61H 1/02* (2006.01)
*B25J 9/00* (2006.01)
*A63B 21/00* (2006.01)
*A63B 23/04* (2006.01)

(52) U.S. Cl.
CPC ............. *A61H 3/00* (2013.01); *A61H 1/0237* (2013.01); *A63B 21/4011* (2015.10); *B25J 9/0006* (2013.01); *A61H 2201/1207* (2013.01); *A61H 2201/164* (2013.01); *A61H 2201/1628* (2013.01); *A61H 2201/5069* (2013.01); *A63B 23/04* (2013.01)

(58) Field of Classification Search
CPC .... A61F 2/68; A61F 2/70; A61H 3/00; A61H 1/0237; B25J 9/0006
See application file for complete search history.

(56) References Cited

U.S. PATENT DOCUMENTS

| 10,278,885 B1* | 5/2019 | Smith ................. A61H 1/0237 |
| 2015/0150694 A1* | 6/2015 | Pusch ....................... A61F 2/64 |
| | | 623/24 |

FOREIGN PATENT DOCUMENTS

| EP | 2 178 680 B1 | 5/2014 |
| JP | 2015-080621 A | 4/2015 |

(Continued)

OTHER PUBLICATIONS

Office Action dated Jul. 10, 2020 issued in the corresponding German Patent Application No. 10 2017 223 442.3 with the English translation thereof.

*Primary Examiner* — Marcia L Watkins
(74) *Attorney, Agent, or Firm* — Carrier Blackman & Associates, P.C.; William D. Blackman; Joseph P. Carrier

(57) ABSTRACT

A motion assist device includes a drive mechanism that applies a force to the body of a user through the intermediary of a first orthosis and a second orthosis, posture detectors that detect the posture of the user, and a control unit that controls the drive mechanism. A transmission mechanism of the drive mechanism is configured to be switchable between a transmission mode, in which a driving force based on a spring is transmitted to move a joint into a predetermined state, and a non-transmission mode, in which a joint can be freely moved without transmitting the driving force that has been accumulated. The control unit automatically switches the transmission mechanism to the non-transmission mode when a predetermined trigger event is recognized based on the posture of the user.

6 Claims, 5 Drawing Sheets

(56) References Cited

FOREIGN PATENT DOCUMENTS

WO   2013/019749 A1   2/2013
WO   2014/005709 A2   1/2014
WO   2017/105996 A1   6/2017

* cited by examiner

FIG.3

| MODE | | SUN GEAR | RING GEAR | CARRIER | DECELERATION/ACCELERATION NORMAL ROTATION/REVERSE ROTATION |
|---|---|---|---|---|---|
| TRANSMISSION MODE | 2ND POSTURE → 1ST POSTURE (CROUCHING) | OUTPUT | INPUT | FIXED | ACCELERATION · REVERSE ROTATION |
| | 1ST POSTURE → 2ND POSTURE (STANDING UP) | INPUT | OUTPUT | FIXED | DECELERATION · REVERSE ROTATION |
| NON-TRANSMISSION MODE | | FIXED | INPUT/OUTPUT | INPUT/OUTPUT | DECELERATION · NORMAL ROTATION |

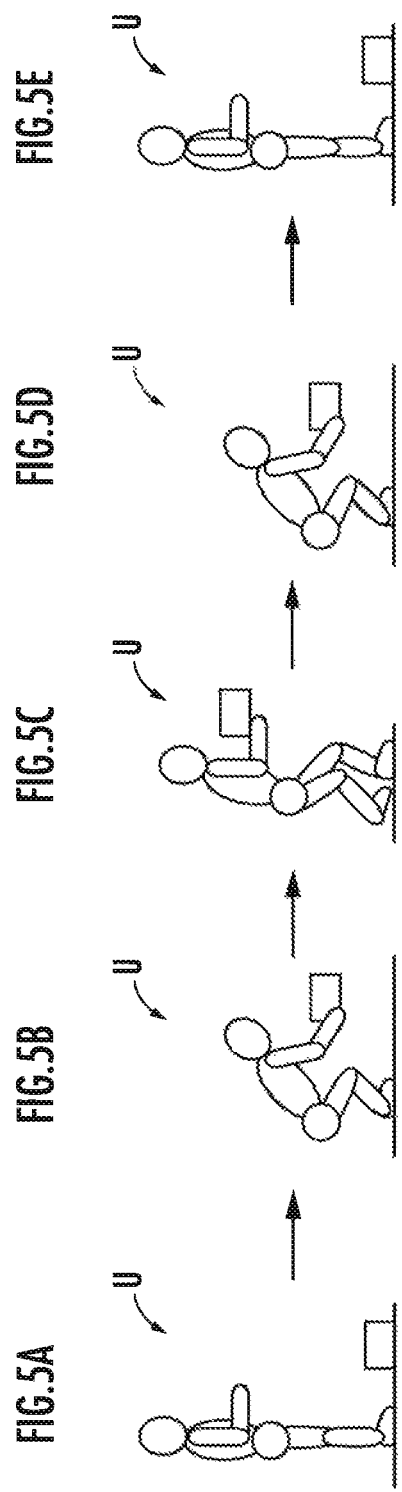

MOTION ASSIST DEVICE

BACKGROUND OF THE INVENTION

Field of the Invention

The present invention relates to a motion assist device that assists the motion of a joint of a user.

Description of the Related Art

Hitherto, there has been a motion assist device provided with a first orthosis to be attached to a portion on one side of a joint of a user, a second orthosis to be attached to a portion on the other side of the joint of the user, a first frame connected to the first orthosis, a second frame connected to the second orthosis, and a drive mechanism that changes the relative positions of the first frame and the second frame. A force is applied to the body of the user through the intermediary of the frames and the orthoses by the driving force from the drive mechanism, thereby assisting the motion of the joint of the user.

As this type of motion assist device, there is known a motion assist device adapted to convert the elastic force of a coil spring incorporated in a drive mechanism into a driving force and to transmit the driving force to a first frame secured to a thigh or a second frame secured to a crus, thereby assisting the motion of a knee of the user (refer to, for example, Patent Document 1).

A motion assist device using an elastic member, such as a coil spring, as a drive source, like the motion assist device described in Patent Document 1 requires lower power and a simpler control unit, thus providing advantages such as lighter weight and a longer operating time, as compared with a motion assist device that uses an actuator or the like as the drive source.

Meanwhile, the motion assist device using an elastic member such as a coil spring as its drive source continues to apply a driving force at all times when a user takes a predetermined posture, posing a problem in that the user has a difficulty maintaining a predetermined state and an attempt to maintain the predetermined state requires the user to resist the applied load.

To be specific, if, for example, the motion assist device is adapted to accumulate an elastic force when a user crouches and to release the accumulated elastic force thereby to assist the standing up motion of the user, then the user will continue to be subjected to a force from the motion assist device in the standing up direction. This has been posing a problem in that the user will have a difficulty maintaining the crouching state (e.g. a state in which the user is sitting on a chair).

Therefore, the motion assist device described in Patent Document 1 is provided with a mechanism that enables the elastic force accumulated in the coil spring to be released without transmitting the elastic force to a frame at any timing that the user desires. This makes it possible for the motion assist device described in Patent Document 1 to engage the state in which a force is not applied even when the user is in a posture in which a force is supposed to be applied to the user to assist his/her motion.

Patent Document 1: Japanese Patent Application Laid-Open No. 2015-080621

However, the motion assist device described in Patent Document 1 has been posing a problem in that, once the elastic force is released, the elastic force cannot be accumulated to assist a motion unless an operation is performed for making it possible to accumulate the elastic force again.

For this reason, there has been a problem with the conventional motion assist device described in Patent Document 1 in that the device is incapable of assisting a motion at a proper timing in a use environment that involves frequent switching between a state in which the assist of a motion is required and a state in which the assist of a motion is not required.

Meanwhile, if an actuator or the like is used as the drive source, then the assist of a motion can be easily performed at a proper timing even in the foregoing use environment. As described above, however, a motion assist device using an actuator or the like as the drive source has been presenting a problem of a heavier weight and a shorter operating time.

SUMMARY OF THE INVENTION

The present invention has been made in view of the background described above, and it is an object of the invention to provide a lightweight motion assist device which has a sufficiently long operating time and which is capable of assisting a motion at a proper timing.

To this end, a motion assist device according to the present invention is a motion assist device adapted to assist a motion of a joint of a user, including: a first orthosis adapted to be attached to a portion on one side of the joint of the user; a second orthosis adapted to be attached to a portion on the other side of the joint of the user; a first frame connected to the first orthosis; a second frame which is connected to the second orthosis and a relative position of which with respect to the first frame can be changed; a drive mechanism which transmits a driving force to the first frame or the second frame so as to change the relative positions of the first frame and the second frame thereby to apply a force to the body of the user through the first orthosis and the second orthosis such that the joint is in a predetermined state; a posture detection unit which detects a posture of the user; and a control unit which controls the drive mechanism, wherein the drive mechanism has an elastic member secured to one of the first frame and the second frame, and a transmission mechanism which converts an elastic force transmitted from the elastic member into the driving force and transmits the driving force to the other of the first frame and the second frame, the elastic member accumulates the elastic force in a case where the posture of the user becomes a first posture and releases the elastic force in a case where the posture of the user becomes a second posture, the transmission mechanism is switchable between a transmission mode in which the elastic force is accumulated as the joint moves or the driving force is transmitted to move the joint into the predetermined state as the elastic force is released, and a non-transmission mode in which the accumulated elastic force is maintained and the joint can be freely moved without transmitting the driving force, and the control unit is configured to automatically switch the transmission mechanism to the non-transmission mode in a case where a predetermined trigger event is recognized after the posture of the user becomes the first posture and before the posture of the user becomes the second posture.

Thus, the motion assist device according to the present invention uses an elastic member as its drive source. Therefore, the motion assist device requires lower power and a simpler control unit, so that the motion assist device has a lighter weight and a longer operating time, as compared with a motion assist device that uses an actuator or the like as its drive source.

Further, the motion assist device according to the present invention can be switched between a transmission mode, in which a motion is assisted or an elastic force is accumulated, and a non-transmission mode, in which an accumulated elastic force is maintained (i.e. no motion assist) and a joint can be freely moved. The switching between the modes is automatically accomplished when the control unit recognizes a predetermined trigger event on the basis of the posture of the user detected by a posture sensor.

Thus, the motion assist device according to the present invention can assist a motion at a proper timing without the need for a special operation to be performed by a user even in a use environment that involves frequent switching between the mode in which the assist of a motion is required and the mode in which the assist of a motion is not required.

Further, the motion assist device according to the present invention may be configured such that the joint is a knee joint, the first orthosis is adapted to be attached to a thigh of the user, the second orthosis is adapted to be attached to a crus of the user, the first posture is a posture in which the user is bending his/her knees, and the second posture is a posture in which the user is standing upright.

Further, the motion assist device according to the present invention may be configured such that the transmission mechanism has a chassis, a planetary gear mechanism having a plurality of elements that are rotatable in the chassis, and an engagement mechanism, the plurality of elements include an input element connected to one of the first orthosis and the second orthosis through the elastic member, an output element connected to the other of the first orthosis and the second orthosis, and a fixed element, and the engagement mechanism switches a state of the input element from a rotatable state to a fixed state according to a signal from the control unit and also switches a state of the fixed element from a fixed state to a rotatable state thereby to switch the drive mechanism from the transmission mode to the non-transmission mode, switches the state of the input element from the fixed state to the rotatable state, and switches the state of the fixed element from the rotatable state to the fixed state thereby to switch the drive mechanism from the non-transmission mode to the transmission mode.

Further, if a planetary gear mechanism is used as the transmission mechanism, then the motion assist device according to the present invention may be configured such that the input element is a sun gear, the output element is a ring gear, and the fixed element is a carrier.

Further, in the motion assist device according to the present invention, if a planetary gear mechanism is used as a transmission mechanism and if an input element is composed of a sun gear, an output element is composed of a ring gear, and a fixed element is composed of a carrier, then according to a signal from the control unit, the engagement mechanism switches the carrier from a rotatable state to a fixed state and switches the sun gear from a fixed state to a rotatable state so that a force from the joint is transmitted to the elastic member and the elastic force is accumulated in the elastic member, thereby to switch the drive mechanism from the non-transmission mode to the transmission mode, in which the elastic force is accumulated as the joint moves.

Further, in the motion assist device according to the present invention, if a planetary gear mechanism is used as a transmission mechanism and if an input element is composed of a sun gear, an output element is composed of a ring gear, and a fixed element is composed of a carrier, then according to a signal from the control unit, the engagement mechanism switches the carrier from a rotatable state to a fixed state and also switches the sun gear from a fixed state to a rotatable state so that the elastic force is released from the elastic member and the driving force based on the elastic force is transmitted to the joint, thereby to switch the driving mechanism from the non-transmission mode to the transmission mode, in which the driving force is transmitted as the elastic force is released so as to move the joint to become a predetermined state.

Preferably, the motion assist device according to the present invention includes a control mode selector switch, and the control unit is configured to switch between the transmission mode and the non-transmission mode upon receipt of a signal from the control mode selector switch.

Thus, the arrangement that enables manual switching between the transmission mode and the non-transmission mode makes it possible to assist a motion at a further proper timing.

BRIEF DESCRIPTION OF THE DRAWINGS

FIG. 3 is a table illustrating the state of each element of the planetary gear mechanism in each mode of the drive mechanism of the motion assist device in FIG. 1;

FIG. 5A to FIG. 5E present schematic diagrams illustrating the postures of a user in the individual steps of his/her motion, the user wearing the motion assist device in FIG. 1.

DESCRIPTION OF THE PREFERRED EMBODIMENTS

The following will describe an embodiment of the present invention with reference to the accompanying drawings.

First, referring to FIG. 1 and FIG. 2, the schematic configuration of a motion assist device A will be described.

Figure 1:
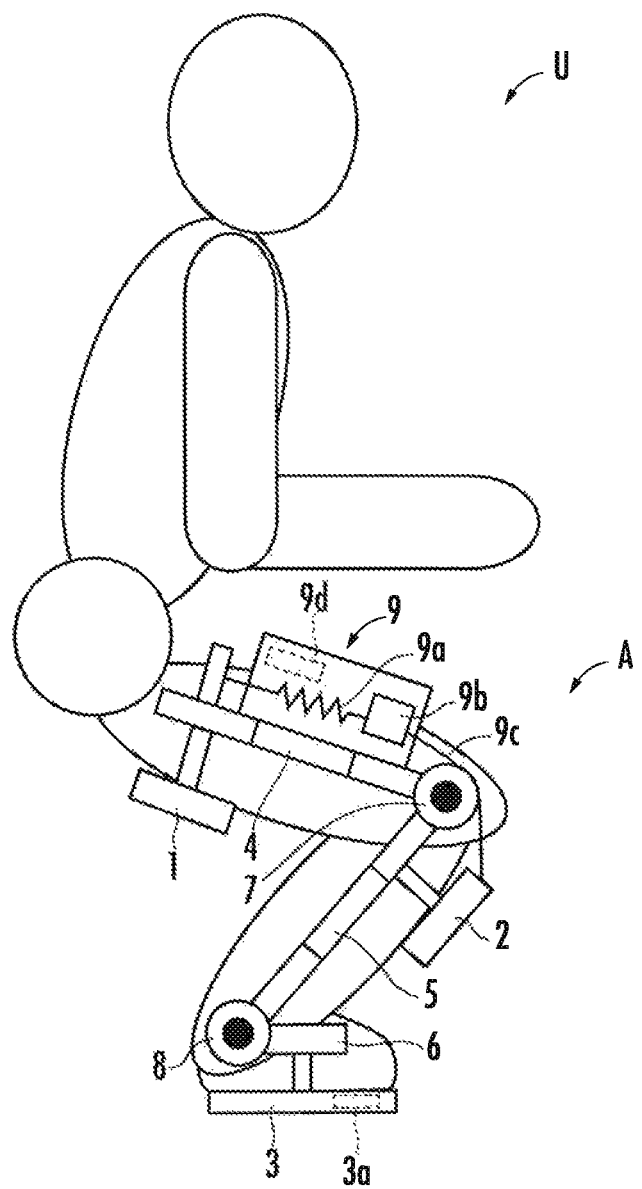
FIG. 1 is an explanatory diagram schematically illustrating the configuration of a motion assist device according to an embodiment.

As illustrated in FIG. 1, the motion assist device A is adapted to be attached to the lower body of a user U to assist the motion of a knee joint of the user U.

The motion assist device A includes a first orthosis 1 to be attached to a thigh of the user U, a second orthosis 2 to be attached to a crus of the user U, and a third orthosis 3 to be attached to a foot of the user U. The motion assist device A applies a force to the body of the user U through the intermediary of the orthoses so as to assist a motion (specifically bending and stretching motions) of the user U. The third orthosis 3 incorporates a load sensor 3a, which detects a floor reaction force received by the user U.

A first frame 4 extending along the thigh of the user U is connected to the first orthosis, a second frame 5 extending along a crus of the user U is connected to the second orthosis, and a third frame 6 extending along a foot is connected to the third orthosis 3.

The first frame 4 and the second frame 5 are relatively rotatable through a first joint section 7. The second frame 5 and the third frame 6 are relatively rotatable through a second joint section 8.

The first joint section 7 is provided such that the first joint section 7 is placed at a position corresponding to a knee joint of the user U when the user U puts on the motion assist device A. The second joint section 8 is provided such that the second joint section 8 is placed at a position corresponding to the joint of an ankle of the user U when the user U puts on the motion assist device A.

The first joint section 7 and the second joint section 8 incorporate sensors for detecting the angle of a corresponding joint. Further, the first joint section 7 has a pulley (not illustrated), and the pulley has a wire 9c, which will be discussed hereinafter, placed thereon.

A drive mechanism 9 is fixed to the first frame 4. The drive mechanism 9 includes a spring 9a (elastic member) having one end thereof fixed to the first frame 4, a transmission mechanism 9b to which the other end of the spring 9a is connected and which converts the elastic force transmitted from the spring 9a into a driving force, a wire 9c having one end thereof connected to the transmission mechanism 9b and the other end thereof connected to the second orthosis 2, and a control unit 9d for controlling the transmission mechanism 9b.

The spring 9a is stretched by the muscle force of the user U through the intermediary of the first orthosis 1, the second orthosis 2, the wire 9c, and the transmission mechanism 9b, and accumulates the elastic force (i.e. accumulates the elastic energy) when the user U crouches (the first posture). When the user U becomes a standing upright posture (the second posture), the accumulated elastic force is released and the force is applied to the body of the user U through the intermediary of the transmission mechanism 9b, the wire 9c, the second orthosis 2, and the first orthosis 1.

In the present embodiment, the coil type spring 9a is used as the elastic member. However, the elastic member in the present invention is not limited to the coil type spring and may be others insofar as they can accumulate and release an elastic force. For example, urethane rubber or the like may be used as the elastic member.

The wire 9c applies a force in an attracting direction to the second orthosis 2 according to the driving force applied from the transmission mechanism 9b. This causes a force in a direction for standing the thigh upright with respect to the crus (i.e. a force for assisting the standing up motion) to be applied to the thigh and the crus of the user U through the intermediary of the first orthosis 1 and the second orthosis 2.

The control unit 9d estimates the posture of the user U on the basis of the angle of the knee joint of the user U detected by the sensor of the first joint section 7, the angle of an ankle joint of the user U detected by the sensor of the second joint section 8, and the floor reaction force detected by the load sensor 3a of the third orthosis 3. This means that, in the motion assist device A, the foregoing sensors constitute the posture detection unit that detects the posture of the user U.

Further, based on the estimated posture, the control unit 9d switches the mode of the transmission mechanism 9b to the transmission mode (transmission state), in which a motion is assisted, or to the non-transmission mode (non-transmission state), in which the user U can freely move his/her knee joint while maintaining the accumulated elastic force (i.e. without assisting the motion of the user U).

Figure 2:
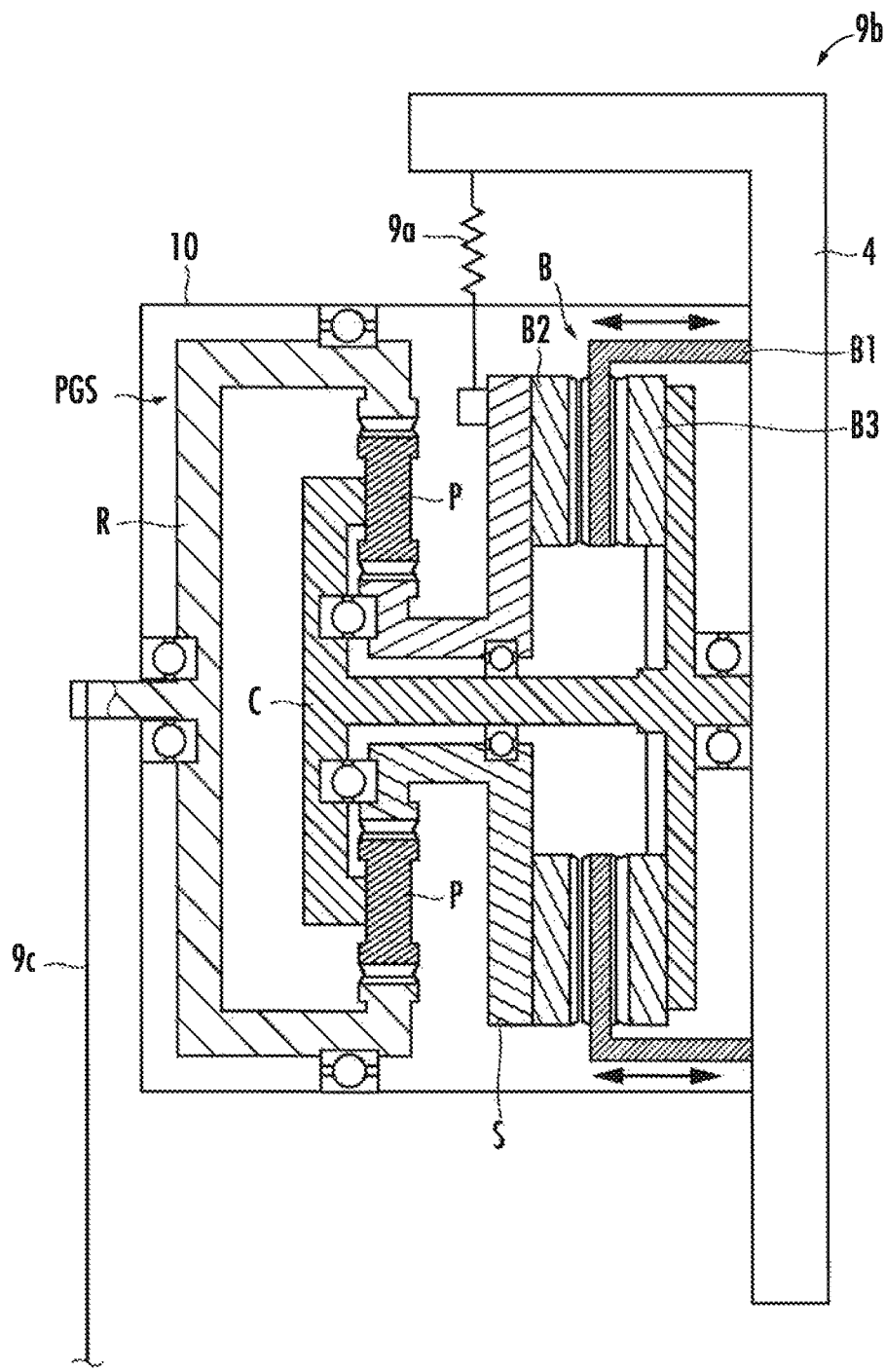
FIG. 2 is a sectional view illustrating the configuration of a planetary gear mechanism of a drive mechanism of the motion assist device in FIG. 1.

Referring now to FIG. 2, the transmission mechanism 9b will be described.

As illustrated in FIG. 2, the transmission mechanism 9b includes a chassis 10 fixed to the first frame 4, a planetary gear mechanism PGS disposed inside the chassis 10, and a brake B (engagement mechanism).

The planetary gear mechanism PGS is composed of a sun gear S (input element) connected to the first orthosis 1 through the spring 9a, a ring gear R (output element) connected to the second orthosis 2 through the wire 9c, a pinion P meshed with the sun gear S and the ring gear R, and a carrier C (fixed element), which rotatably and revolvably supports the pinion P.

The planetary gear mechanism PGS is a so-called single pinion type planetary gear mechanism, and a planetary gear mechanism which is a so-called minus planetary gear mechanism or negative planetary gear mechanism, in which, when the sun gear S is rotated while the carrier C is fixed, the ring gear R is decelerated and rotated in a direction different from that of the sun gear S.

The brake B is composed of a first engagement element B1 fixed to be movable in an axial direction with respect to the first frame 4, a second engagement element B2 fixed to the sun gear S, and a third engagement element B3 fixed to the carrier C. The first engagement element B1 is moved by a solenoid (not illustrated) in the axial direction according to a signal from the control unit 9d and is selectively engaged with either the second engagement element B2 or the third engagement element B3.

Referring to the table of FIG. 3, in the state in which the first engagement element B1 and the third engagement element B3 are engaged (the state illustrated in FIG. 2), the rotation of the carrier C, to which the third engagement element B3 is fixed, is prevented (i.e. the carrier C is fixed to the chassis 10), thus setting the transmission mechanism 9b to the transmission mode.

In the transmission mode, the sun gear S can be rotated (in an output direction) to transmit the force from the knee joint to the spring 9a and to accumulate the elastic force in the spring 9a. Further, the ring gear R can be rotated in a knee bending direction (in an input direction).

Thus, when the user U changes his/her posture from the second posture to the first posture (crouching), the force for the user U to bend his/her knee is input to the ring gear R through the intermediary of the second orthosis 2 and the wire 9c and then applied to the spring 9a through the intermediary of the carrier C and the sun gear S. As a result, the elastic force is accumulated in the spring 9a.

Further, in the transmission mode, the sun gear S can be rotated (in the input direction) to release the elastic force from the spring 9a and to transmit the driving force based on the elastic force to the knee joint. Further, the ring gear R can be rotated in a knee stretching direction (the output direction).

Thus, when the user U changes his/her posture from the first posture to the second posture (standing up), the elastic force released from the spring 9a is input to the ring gear R through the intermediary of the sun gear S and the carrier C and then applied to the user U through the intermediary of the wire 9c and the second orthosis 2. As a result, the motion of the knee joint of the user U is assisted.

Meanwhile, in the state in which the first engagement element B1 and the second engagement element B2 are engaged, the rotation of the sun gear S, to which the second engagement element B2 is fixed, is prevented (i.e. the sun gear S is fixed to the chassis 10), thus setting the transmission mechanism 9b to the non-transmission mode.

In the non-transmission mode, the sun gear S is fixed, so that neither will the elastic force be accumulated in the spring 9a connected to the sun gear S nor will the elastic force accumulated in the spring 9a be released. Further, although the ring gear R freely rotates, the rotation will not be transmitted to the sun gear S.

Hence, in the non-transmission mode, the user U can freely move his/her knee joint while maintaining the elastic force accumulated in the spring 9a.

Further, if the first engagement element B1 is engaged with neither the second engagement element B2 nor the third engagement element B3, then the sun gear S, to which the second engagement element B2 is fixed, and the carrier C, to which the third engagement element is fixed, freely rotates. This causes the elastic force accumulated in the spring 9a to be released (reset) without transmitting the driving force to the joint of the user U.

The structure for the resetting is not limited to the foregoing structure. As an alternative structure, a clutch may be provided between the spring 9a and the first frame 4 or the sun gear S, and the first engagement element B1 may be selectively engaged with either the second engagement element B2 or the third engagement element B3.

In the motion assist device A, the chassis 10 is fixed to the first frame 4. Alternatively, however, the chassis 10 may be fixed to the first orthosis 1, the second orthosis 2, or the second frame 5.

Further, in the motion assist device A, the sun gear S of the planetary gear mechanism PGS serves as the input element, the ring gear R serves as the output element, and the carrier C serves as the fixed element. Alternatively, however, the ring gear R or the carrier C may have the spring 9a connected thereto so as to serve as the input element, the sun gear S or the carrier C may have the second orthosis 2 connected thereto so as to serve as the output element, or the sun gear S or the ring gear R may serve as the fixed element.

Further, the motion assist device A uses the single pinion type planetary gear mechanism as the planetary gear mechanism, but may alternatively use a double pinion type planetary gear mechanism.

Further, in the motion assist device A, the engagement mechanism uses a solenoid. In place of the solenoid, however, a dog clutch, an electromagnetic brake, a disc brake or the like may be used to constitute the engagement mechanism.

Referring now to FIG. 4 and FIGS. 5A-5E, the control performed by the control unit 9d will be described. When the use of the motion assist device A is started (i.e. in an initial state), the elastic force is accumulated in the spring 9a when the user U takes the first posture (the knee bending posture), and when the user U takes the second posture (the standing upright posture), the transmission mode is set, in which the driving force is transmitted to assist a motion.

Figure 4:
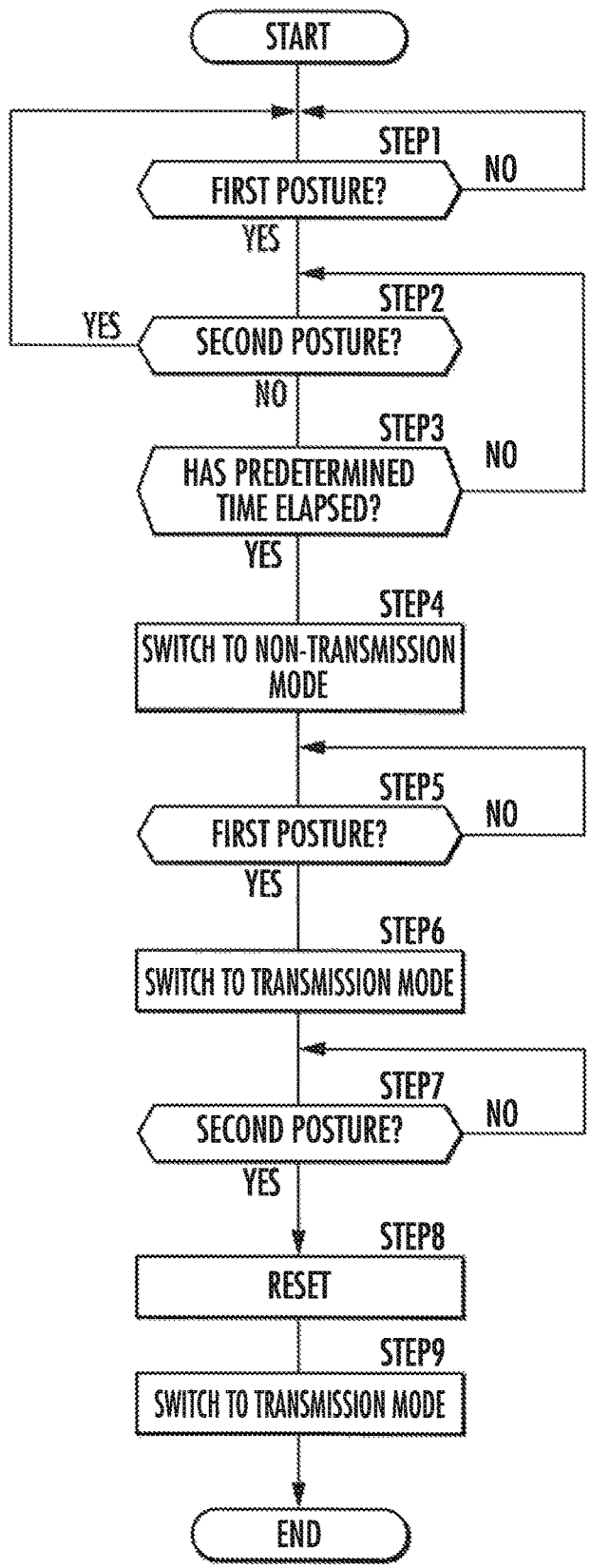
FIG. 4 is a flowchart illustrating a switching procedure of a driving force performed by a control unit of the motion assist device in FIG. 1.

First, the control unit 9d determines whether the posture of the user U is the knee bending posture (the first posture) on the basis of the angle of the knee joint of the user U detected by the sensor of the first joint section 7, the angle of an ankle joint of the user U detected by the sensor of the second joint section 8, and the floor reaction force detected by the load sensor 3a of the third orthosis 3 (STEP1 of FIG. 4).

More specifically, the control unit 9d determines, on the basis of the detection signals from the sensors, whether the user U has taken the squatting posture with the knees bent (the first posture) in order to, for example, lift a luggage (whether the state has been shifted from the state illustrated in FIG. 5A to the state illustrated in FIG. 5B). In other words, the control unit 9d determines whether the user U has taken the first posture, causing the elastic force to be accumulated in the spring 9a.

If the control unit 9d determines that the user U is not in the first posture (NO in STEP1), then the control unit 9d returns to STEP1 to perform the determination again.

Meanwhile, if the control unit 9d determines that the user U has taken the first posture (YES in STEP1), then the control unit 9d determines whether the posture of the user U has changed to the standing upright posture (the second posture) on the basis of the angle of the knee joint of the user U detected by the sensor of the first joint section 7, the angle of the ankle joint of the user U detected by the sensor of the second joint section 8, and the floor reaction force detected by the load sensor 3a of the third orthosis 3 (STEP2 of FIG. 4).

More specifically, the control unit 9d determines, on the basis of the detection signals from the sensors, whether the posture of the user U has changed to the standing upright posture (whether the state has changed from the state illustrated in FIG. 5B to the state illustrated in FIG. 5E).

If the control unit 9d determines that the posture of the user U has changed to the second posture (YES in STEP2), then the control unit 9d returns to STEP1 to perform the determination again.

At this time (when the posture is the standing upright posture (when the state illustrated in FIG. 5B is immediately changed to the state illustrated in FIG. 5E), the transmission mechanism 9b is in the transmission mode. Hence, the driving force based on the elastic force accumulated in the spring 9a when the user U took the crouching posture, which is the first posture (when YES in STEP1), is applied to the user U, thereby assisting the standing up motion.

Meanwhile, if the control unit 9d determines that the user U is not yet in the second posture (NO in STEP2), then the control unit 9d determines whether a specified time set in advance has elapsed in a state of not being the second posture (whether the trigger event has occurred) (STEP3 of FIG. 4).

More specifically, based on the detection signals from each of the sensors, the control unit 9d determines whether the first posture has been maintained for a predetermined time or more, or a semi-crouching posture, which is on the way to the second posture and not the first posture (the state illustrated in FIG. 5C), has been maintained for a predetermined time or more, the point of time at which the first posture (the state illustrated in FIG. 5B) is reached being the reference.

If the control unit 9d determines that a predetermined period of time has not elapsed (NO in STEP3), then the control unit 9d returns to STEP2 to determine again whether the posture of the user U has reached the second posture.

Meanwhile, if the control unit 9d determines that the predetermined period of time has elapsed (YES in STEP3), then the control unit 9d switches the transmission mechanism 9b to the non-transmission mode (STEP4 of FIG. 4).

Once the transmission mechanism 9b is switched to the non-transmission mode, no force will be applied from the motion assist device A even when the user U moves in the semi-crouching posture or the like, thus enabling the user U to freely move his/her knee joints.

Next, the control unit 9d determines whether the posture of the user U has changed to the crouching posture (the first posture) on the basis of the angle of the knee joint of the user U detected by the sensor of the first joint section 7, the angle of the ankle joint of the user U detected by the sensor of the second joint section 8, and the floor reaction force detected by the load sensor 3a of the third orthosis 3 (STEP5 of FIG. 4).

More specifically, the control unit 9d determines, on the basis of the detection signals from the sensors, whether the posture has changed to the crouching posture from the semi-crouching posture (whether the state has changed from the state illustrated in FIG. 5C to the state illustrated in FIG. 5D).

If the control unit 9*d* determines that the posture of the user U has not yet changed to the first posture (NO in STEP5), then the control unit 9*d* returns to STEP5 to determine again whether the posture of the user U has reached the second posture.

Meanwhile, if the control unit 9*d* determines that the posture of the user U has reached the first posture (YES in STEP5), then the control unit 9*d* switches the transmission mechanism 9*b* to the transmission mode (STEP6 of FIG. 4).

Thus, the driving force based on the elastic force that has been accumulated in the spring 9*a* and has not been released is applied to the user U so as to assist his/her standing up motion.

Next, the control unit 9*d* determines whether the posture of the user U has changed to the standing upright posture (the second posture) on the basis of the angle of the knee joint of the user U detected by the sensor of the first joint section 7, the angle of the ankle joint of the user U detected by the sensor of the second joint section 8, and the floor reaction force detected by the load sensor 3*a* of the third orthosis 3 (STEP7 of FIG. 4).

More specifically, the control unit 9*d* determines, on the basis of the detection signals from the sensors, whether the posture has changed to the standing upright posture (whether the state has changed from the state illustrated in FIG. 5D to the state illustrated in FIG. 5E).

If the control unit 9*d* determines that the posture of the user U has not yet changed to the second posture (NO in STEP7), then the control unit 9*d* returns to STEP7 to perform the determination again.

Meanwhile, if the control unit 9*d* determines that the posture of the user U has changed to the second posture (YES in STEP7), then the control unit 9*d* releases the accumulated elastic force to reset the state of the drive mechanism 9 to the initial state (STEP8 of FIG. 4).

Thus, even if the elastic force has been accumulated in the spring 9*a* despite the fact that the posture of the user U has changed to the second posture due to, for example, a slight difference between the initial second posture (the state illustrated in FIG. 5A) and the next second posture (the state illustrated in FIG. 5E), the elastic force will be released and the state of the motion assist device A will be initialized.

Lastly, the control unit 9*d* switches the transmission mechanism 9*b* to the transmission mode and terminates the processing (STEP9 of FIG. 4).

As described above, the motion assist device A uses the spring 9*a*, which is an elastic member, as its drive source. Hence, the motion assist device A requires less power, is lighter in weight due to the control unit 9*d* having a simpler configuration, and has a longer operating time, as compared with a motion assist device that uses an actuator or the like as its drive source.

Further, the motion assist device A enables switching between the transmission mode for assisting a motion and a non-transmission mode that enables free movement of a joint while maintaining an accumulated elastic force (i.e. with no motion assist).

Further, the switching is performed on the basis of the posture of the user U that is estimated on the basis of the angle of the knee joint of the user U detected by the sensor of the first joint section 7, the angle of the ankle joint of the user U detected by the sensor of the second joint section 8, and the floor reaction force detected by the load sensor 3*a* of the third orthosis 3.

Further, the switching is automatically performed when the control unit 9*d* recognizes a predetermined trigger event (if a predetermined time elapses after the user U becomes the first posture and without changing to the second posture).

Thus, the motion assist device A can assist a motion at a proper timing without the need for a special operation performed by the user U even in a use environment that involves frequent switching between the state in which a motion assist is required and the state in which a motion assist is not required.

In the foregoing embodiment, the mode is switched to the non-transmission mode (STEP4) and then switched back to the transmission mode according to the posture of the user U (STEPS 5 and 6). This is performed to accomplish effective use of the elastic force remaining in the spring 9*a*.

However, the foregoing control may not necessarily be performed. For example, if there is no need to use the remaining elastic force, then the processing in STEPS 5 and 6 may be omitted, and the elastic force may be simply released by the resetting in STEP8.

Further, for greater ease of use, a control mode selector switch (e.g. a switch or the like that is actuated by the user U biting the switch or the like in his/her mouth) may be provided. In this configuration, the switching is basically automatic, but an arrangement may be made to enable the switching to be accomplished at any timing.

The above has described the embodiment illustrated in the accompanying drawings. However, the present invention is not limited to the embodiment.

For example, in the foregoing embodiment, the motion assist device A is intended to be used to assist the motion of a knee joint of the user U. However, the motion assist device according to the present invention may be used to assist the motion of the hip, a shoulder or an elbow.

For example, if the motion assist device is adapted to assist the motion of an elbow, then the first posture will be a posture in which the elbow is extended and the second posture will be a posture in which the elbow is bent. The motion assist device is configured such that, when lifting an object, the driving force is transmitted to assist a motion that changes posture of the elbow from the first posture to the second posture.

At this time, a control unit is to switch a transmission mechanism to a transmission mode from a non-transmission mode when the posture of a user changes from the first posture to the second posture.

Further, in the foregoing embodiment, the planetary gear mechanism PGS is adopted as the switchable transmission mechanism 9*b*. However, the transmission mechanism in the present invention is not limited to the planetary gear mechanism, and may be other mechanisms insofar as the mechanisms are adapted to generate a driving force based on the elastic force of an elastic member and are switchable between a transmission mode, in which a joint is moved into a predetermined state, and a non-transmission mode, in which the joint can be freely moved. For example, the transmission mechanism may be composed using a dog clutch, an electromagnetic brake, a solenoid, a hydraulic circuit or the like.

Further, in the foregoing embodiment, the sensors that detect the angle of a knee joint, the angle of an ankle joint, and a ground contact load are used as the posture detectors for detecting the posture of the user U. However, the posture detectors in the present invention are not limited to such sensors and may be other means insofar as they are capable of detecting the posture of a user. For example, only one or two of the sensors that detect the angle of a knee joint, the angle of an ankle joint, and a ground contact load may be used as the sensor or sensors. Further, a gyro sensor that detects the height of a hip position may be used, or a user may be photographed using an externally installed camera and the posture of the user may be detected from the photographed image.

DESCRIPTION OF REFERENCE NUMERALS

1 . . . First orthosis; 2 . . . Second orthosis; 3 . . . Third orthosis; 3a . . . Load sensor; 4 . . . First frame; 5 . . . Second frame; 6 . . . Third frame; 7 . . . First joint section; 8 . . . Second joint section; 9 . . . Drive mechanism; 9a . . . Spring (Elastic member); 9b . . . Transmission mechanism; 9c . . . Wire; 9d . . . Control unit; 10 . . . Chassis; A . . . Motion assist device; B . . . Brake (Engagement mechanism); B1 . . . First engagement element; B2 . . . Second engagement element; B3 . . . Third engagement element; C . . . Carrier (Fixed element); P . . . Pinion; PGS . . . Planetary gear mechanism; R . . . Ring gear (Output element); S . . . Sun gear (Input element); and U . . . User.

What is claimed is:

1. A motion assist device adapted to assist a motion of a joint of a user, said motion assist device comprising:
    a first orthosis adapted to be attached to a portion on one side of the joint of the user;
    a second orthosis adapted to be attached to a portion on the other side of the joint of the user;
    a first frame connected to the first orthosis;
    a second frame which is connected to the second orthosis and a relative position of which, with respect to the first frame, can be changed;
    a drive mechanism which is configured to selectively transmit a driving force to the first frame or the second frame so as to change the relative positions of the first frame and the second frame, thereby to apply a force to a body of the user through the first orthosis and the second orthosis such that the joint is in a predetermined state;
    a posture detection unit which is operable to detect a posture of the user; and
    a control unit which controls the drive mechanism,
    wherein the drive mechanism has an elastic member secured to one of the first frame and the second frame, and a transmission mechanism which is operable to convert an elastic force transmitted from the elastic member into the driving force and to transmit the driving force to the other of the first frame and the second frame,
    the transmission mechanism comprising a chassis, a planetary gear mechanism having a plurality of elements that are rotatable in the chassis, and an engagement mechanism which constitutes a brake,
    the plurality of elements of the planetary gear mechanism comprising an input element, which is a sun gear connected to one of the first orthosis and the second orthosis through the elastic member, an output element, which is a ring gear, connected to the other of the first orthosis and the second orthosis, and a fixed element which is a carrier,
    the engagement mechanism comprising:
    a first engagement element which is axially movable in relation to the first frame;
    a second engagement element which is fixed to the sun gear, and
    a third engagement element which is fixed to the carrier,
    wherein the first engagement element is selectively engagable with either the second engagement element or the third engagement element,
    and wherein the motion assist device is configured such that during operation thereof,
    the elastic member accumulates the elastic force in a case where the posture of the user becomes a first posture and releases the elastic force in a case where the posture of the user becomes a second posture,
    the transmission mechanism is switchable between:
    a transmission mode in which the first engagement element is engaged with the third engagement element, whereby either the elastic force is accumulated as the joint moves, or the driving force is transmitted to move the joint into the predetermined state as the elastic force is released, and
    a non-transmission mode in which the first engagement element is engaged with the second engagement element and rotation of the sun gear is prevented, whereby any accumulated elastic force is maintained and the joint can be freely moved without transmitting the driving force, and
    the control unit is configured to automatically switch the transmission mechanism to the non-transmission mode in a case where a predetermined trigger event is recognized after the posture of the user becomes the first posture and before the posture of the user becomes the second posture.

2. The motion assist device according to claim 1, wherein:
    the joint is a knee joint,
    the first orthosis is adapted to be attached to a thigh of the user,
    the second orthosis is adapted to be attached to a crus of the user,
    the first posture is a posture in which the user is bending knees, and
    the second posture is a posture in which the user is standing upright.

3. The motion assist device according to claim 1, wherein the motion assist device is configured such that, according to a signal from the control unit during operation of the motion assist device, the engagement mechanism switches the carrier from a rotatable state to a fixed state and also switches the sun gear from a fixed state to a rotatable state so that a force from the joint is transmitted to the elastic member and the elastic force is accumulated in the elastic member thereby to switch the drive mechanism from the non-transmission mode to the transmission mode in which the elastic force is accumulated as the joint moves.

4. The motion assist device according to claim 1, wherein the motion assist device is configured such that according to a signal from the control unit during operation of the motion assist device, the engagement mechanism switches the carrier from a rotatable state to a fixed state and also switches the sun gear from a fixed state to a rotatable state so that the elastic force is released from the elastic member and the driving force based on the elastic force is transmitted to the joint thereby to switch the drive mechanism from the non-transmission mode to the transmission mode, in which the driving force is transmitted as the elastic force is released so as to move the joint to attain the predetermined state.

5. The motion assist device according to claim 1, further comprising a control mode selector switch,
    wherein the control unit is configured to switch between the transmission mode and the non-transmission mode upon receipt of a signal from the control mode selector switch.

6. The motion assist device according to claim 1, wherein when the transmission mechanism is in the non-transition mode:

the sun gear is fixed in place, so that neither will additional elastic force be accumulated in the elastic member connected to the sun gear, nor will any elastic force accumulated in the elastic member be released, and the ring gear is capable of rotation, but such rotation will not be transmitted to the sun gear.

\* \* \* \* \*